United States Patent
Yamashita et al.

(10) Patent No.: US 9,782,935 B2
(45) Date of Patent: Oct. 10, 2017

(54) POWDER MATERIAL FOR THREE-DIMENSIONAL MODELING, KIT FOR THREE-DIMENSIONAL MODELING, DEVICE FOR MANUFACTURING THREE-DIMENSIONAL OBJECT, AND METHOD OF MANUFACTURING THREE-DIMENSIONAL OBJECT

(71) Applicants: Yasuyuki Yamashita, Shizuoka (JP); Yasuo Suzuki, Shizuoka (JP); Mitsuru Naruse, Shizuoka (JP); Nozomu Tamoto, Shizuoka (JP); Shigenori Yaguchi, Shizuoka (JP); Hitoshi Iwatsuki, Shizuoka (JP); Kazumi Ohtaki, Shizuoka (JP)

(72) Inventors: Yasuyuki Yamashita, Shizuoka (JP); Yasuo Suzuki, Shizuoka (JP); Mitsuru Naruse, Shizuoka (JP); Nozomu Tamoto, Shizuoka (JP); Shigenori Yaguchi, Shizuoka (JP); Hitoshi Iwatsuki, Shizuoka (JP); Kazumi Ohtaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 31 days.

(21) Appl. No.: 15/065,161

(22) Filed: Mar. 9, 2016

(65) Prior Publication Data
US 2016/0271879 A1 Sep. 22, 2016

(30) Foreign Application Priority Data
Mar. 18, 2015 (JP) .................................. 2015-054645

(51) Int. Cl.
*B29C 67/00* (2017.01)
*B33Y 10/00* (2015.01)
(Continued)

(52) U.S. Cl.
CPC ........ *B29C 67/0085* (2013.01); *B22F 1/0062* (2013.01); *B22F 3/003* (2013.01);
(Continued)

(58) Field of Classification Search
None
See application file for complete search history.

(56) References Cited

U.S. PATENT DOCUMENTS 6,335,097 B1 * 1/2002 Otsuka ................ B29C 67/0081
427/221
2002/0016387 A1 2/2002 Shen
(Continued)

FOREIGN PATENT DOCUMENTS

AU 2004-330743 11/2004
EP 2 402 386 A1 1/2012
(Continued)

OTHER PUBLICATIONS

U.S. Appl. No. 14/968,184, filed Dec. 14, 2015.
(Continued)

*Primary Examiner* — Mary F Theisen
(74) *Attorney, Agent, or Firm* — Oblon, McClelland, Maier & Neustadt, L.L.P.

(57) ABSTRACT

A powder material for three-dimensional modeling includes a base particle and a coverage film including an organic material. The coverage film covers the base particle. The powder material is used for three dimensional modeling and when the coverage film is dissolved in a solvent to prepare a solution and the solution is formed into a coated film on a smooth surface, the coated film has a wetting tension of from 22 mN/m to 28 mN/m.

9 Claims, 2 Drawing Sheets

(51) Int. Cl.
  *B33Y 30/00*    (2015.01)
  *B33Y 70/00*    (2015.01)
  *B22F 1/00*     (2006.01)
  *B22F 3/00*     (2006.01)
  *C04B 35/00*    (2006.01)
  B29K 29/00      (2006.01)
  B29L 31/00      (2006.01)
  C09D 129/04     (2006.01)

(52) U.S. Cl.
  CPC ......... *B22F 3/008* (2013.01); *B29C 67/0081* (2013.01); *C04B 35/00* (2013.01); *B29K 2029/04* (2013.01); *B29L 2031/00* (2013.01); *B33Y 10/00* (2014.12); *B33Y 30/00* (2014.12); *B33Y 70/00* (2014.12); *C09D 129/04* (2013.01)

(56) References Cited

U.S. PATENT DOCUMENTS

| | | |
|---|---|---|
| 2004/0038009 A1 | 2/2004 | Leyden et al. |
| 2006/0251535 A1* | 11/2006 | Pfeifer ................ B22F 1/02 419/36 |
| 2012/0018915 A1* | 1/2012 | Ookubo ............. B29C 67/0081 264/113 |
| 2014/0275317 A1 | 9/2014 | Moussa |
| 2016/0040025 A1 | 2/2016 | Norikane et al. |
| 2016/0177122 A1* | 6/2016 | Naruse ................ C09D 129/04 264/128 |

FOREIGN PATENT DOCUMENTS

| | | |
|---|---|---|
| JP | 5-140438 | 6/1993 |
| JP | 2000-288714 | 10/2000 |
| JP | 2000-328106 | 11/2000 |
| JP | 2003-048253 | 2/2003 |
| JP | 2005-297325 | 10/2005 |
| JP | 2006-200030 | 8/2006 |
| JP | 2008-038144 | 2/2008 |
| JP | 2011-529414 | 12/2011 |
| JP | 5862739 | 1/2016 |
| WO | WO2004/073961 A2 | 9/2004 |
| WO | WO2010/014155 A1 | 2/2010 |
| WO | WO2010/098441 A1 | 9/2010 |
| WO | WO2015/046629 A1 | 4/2015 |

OTHER PUBLICATIONS

U.S. Appl. No. 14/938,257, filed Nov. 11, 2015.
Extended European Search Report issued Aug. 8, 2016 in Patent Application No. 16157451.2.
EPO Communication pursuant to Article 94(3) EPC dated Aug. 1, 2017 in European Application No. 16 157 451.2-1706.

* cited by examiner

POWDER MATERIAL FOR THREE-DIMENSIONAL MODELING, KIT FOR THREE-DIMENSIONAL MODELING, DEVICE FOR MANUFACTURING THREE-DIMENSIONAL OBJECT, AND METHOD OF MANUFACTURING THREE-DIMENSIONAL OBJECT

CROSS-REFERENCE TO RELATED APPLICATIONS

This patent application is based on and claims priority pursuant to 35 U.S.C. §119 to Japanese Patent Application No. 2015-054645 filed on Mar. 18, 2015 in the Japan Patent Office, the entire disclosure of which is hereby incorporated by reference herein.

BACKGROUND

Technical Field

The present invention relates to a powder for 3D (three-dimensional) modeling, a kit for 3D modeling, a device for manufacturing a 3D object, and a method of manufacturing a 3D object.

Background Art

Small lot production of a complex and fine object is demanded. A powder sintering method and a powder adhesion method are known to meet this demand.

The powder sintering method includes steps of forming a thin layer of a powder, irradiating the thin layer with a laser beam to form a thin sintered compact, and sequentially repeating these two steps of laminating the thin sintered compacts to obtain a desired object.

In the powder adhesion method, a desired object is formed by curing a thin powder layer using an adhesive material instead of sintering by laser in the powder sintering method.

Also, a particle is used as a material for 3D printing while the particle contains a liquid as the first composition and a binder soluble in the liquid as the second composition. The liquid or the binder contains a polymerization initiator such as peroxide.

SUMMARY

The present invention provides an improved powder material for three dimensional modeling. The powder material includes a base particle and a coverage film including an organic material. The coverage film covers the base particle. The powder material is used for three dimensional modeling and when the coverage film is dissolved in a solvent to prepare a solution and the solution is formed into a coated film on a smooth surface, the coated film has a wetting tension of from 22 mN/m to 28 mN/m.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

By using the powder material for three dimensional (3D) modeling of the present disclosure, surface smoothness of a powder thin layer is excellent (i.e., rough surface is not formed) and layer thickness is stable, so that a weak portion inviting collapse is not formed during modeling, thereby improving the dimension accuracy of an object.

Powder Material for 3D Modeling

The powder material for 3D modeling of the present disclosure contains a base material (particle) covered with an organic material and may further includes other optional components. The base material is mainly covered with the organic material. However, the coverage film may optionally further contain an inorganic material.

The powder material for 3D modeling is used in a method of manufacturing a 3D object of the present disclosure described later.

Base Material

The base material has no specific limit and can take any form of powder or particle. Examples of the materials therefor are metal, ceramics, carbon, polymer, wood, biocompatible materials, and sand. In terms of manufacturing an object having a strength, the base material is preferably metal, ceramic, etc., which can be subject to sintering at the final stage of modeling.

Specific examples of the metal include, but are not limited to, stainless steel (SUS), iron, copper, titanium, and silver. A specific example of the stainless steel (SUS) is SUS316L.

Specific examples of the ceramic include, but are not limited to, metal oxides such as silica ($SiO_2$), alumina ($Al_2O_3$), zirconia ($ZrO_2$), and titania ($TiO_2$).

Specific examples of the carbon include, but are not limited to, graphite, graphen, carbon nanotube, carbon nanohorn, and fullerene.

Examples of the polymer are known resins insoluble in water.

Specific examples of the wood include, but are not limited to, wood chip and cellulose.

Specific examples of the biocompatible materials include, but are not limited to, polylactic acid and calcium phosphate.

These materials can be used alone or in combination.

It is possible to use powder or particles available on market formed of these materials as the base material in the present disclosure.

Specific examples of such products include, but are not limited to, SUS316L (PSS316L, manufactured by Sanyo Special Steel Co., Ltd.), $SiO_2$ (EXCELICA SE-15K, manufactured by Tokuyama Corporation), $AlO_2$ (TAIMICRON TM-5D, manufactured by TAIMEI CHEMICALS Co., Ltd.), and $ZrO_2$ (TZ-B53, manufactured by TOSOH CORPORATION).

The base material may be subject to known surface reforming treatment in order to improve affinity with the organic material.

The average particle diameter of the base material is not particularly limited. The average particle diameter thereof is preferably from 0.1 μm to 500 μm, more preferably from 5 μm to 300 μm, and furthermore preferably from 15 μm to 250 μm.

When the average particle diameter is in the range of from 0.1 μm to 500 μm, the manufacturing efficiency of a 3D object is excellent and handling property is also good. If a thin layer is formed by using the powder material for 3D modeling described above when the average particle diameter is 500 μm or less, the filling rate of the powder material for 3D modeling in the thin layer is improved, meaning that voids, etc. do not easily occur in the thus-obtained 3D object.

The average particle diameter of the base material can be measured according to known methods using a known particle diameter measuring instrument such as Microtrac HRA (manufactured by NIKKISO CO., LTD.).

The particle size distribution of the base material is not particularly limited and can be suitably selected to a particular application.

The shape, surface area, circularity, fluidity, wettability, etc. of the base material are suitably selected to a particular application.

Organic Material

As the organic material, it is suitable to use an organic material which is dissolved in a modeling liquid and cross-linkable due to working of the cross-linking agent contained in the modeling liquid.

In the present disclosure, as to the solubility of the organic material, it is preferable that 90 percent by mass or more of the organic material is dissolved in a modeling liquid when 1 gram of the organic material described above is mixed and stirred in 100 gram of a solvent constituting a modeling solution at 30 degrees C.

In addition, as to the organic material, 4 percent by mass (w/w percent) solution of the organic material preferably has a viscosity of 40 mPa·s or less at 20 degrees C., more preferably from 1 mPa·s to 35 mPa·s, and particularly preferably 5 mPa·s to 30 mPa·s.

When the thickness is 40 mPa·s or less, the strength of the cured object (3D object) of the powder material (layer) for 3D modeling formed by providing the modeling solution to the powder material for 3D modeling is improved, which makes it free from problems such as losing shape during processing such as sintering or handling conducted after forming the layer. The dimension accuracy of the cured object (3D object) of the powder material (layer) for 3D modeling formed by providing the modeling solution to the powder material for 3D modeling tends to be improved.

The viscosity can be measured according to the measuring method described in JIS K7117.

The organic material is not particularly limited. Organic polymer materials are preferable. Also, being water soluble is preferable in terms of handling property and burden on environment. For example, water soluble resins and water soluble prepolymers are suitable. An aqueous medium can be used as the solvent of the modeling liquid for the powder material for 3D modeling adopting such water soluble organic materials. In addition, when the powder material is abandoned or recycled, it is easy to separate the base material from the organic material by water treatment.

Specific examples of the water soluble resins include, but are not limited to, polyvinylalcohol resins, polyacrylic acid resins, cellulose resins, starch, gelatin, vinyl resins, amide resins, imide resins, acrylic resins, and polyethylene glycol.

If these are water soluble, homopolymers (monopolymers), heteropolymers (copolymers), modified resins, or salts are allowed. Moreover, known functional groups can be introduced into these.

Accordingly, for example, if the organic material is a polyvinyl alcohol resin, polyvinyl alcohol is suitable and modified polyvinyl alcohol (modified by an acetoacetyl group, an acetyl group, or silicone) are also suitable. In addition, butanediol vinyl alcohol copolymers are also an optional.

Moreover, if the organic material is a polyacrylic resin, polyacrylic acid and salts such as sodium polyacrylate are suitable. In addition, if the organic material is a cellulose resin, cellulose is suitable and carboxymethyl cellulose (CMC) is also suitable. Moreover, if the organic material is an acrylic resin, polyacrylic resin and a copolymer of acrylic acid and maleic anhydride are suitable.

If the organic material is a water soluble prepolymer, for example, an adhesive water soluble isocyanate prepolymer contained in a water stop is suitable.

In addition to the water soluble organic materials, the following resins are suitable as the resin: acrylic acid resins, maleic acid resins, silicone, butyral, polyester, polyvinyl acetate, copolymers of vinyl chloride and vinyl acetate, polyethylene, polypropylene, polyacetal, copolymers of ethylene and (meth)acrylic acid, copolymers of α-olefin and maleic anhydride, esterified compounds of copolymers of α-olefin and maleic anhydride, polystyrene, poly(meth)acrylates, copolymers of α-olefin, maleic anhydride, and monomers containing a vinyl group, copolymers of styrene and maleic anhydride, copolymers of styrene and (meth) acrylate, polyamide, epoxy resins, xylene resins, ketone resins, petroleum resins, rosin or derivatives thereof, coumarone-indene resins, terpene resins, polyurethane resins, synthesized rubber such as styrene/butadiene rubber, polyvinyl butyral, nitrile rubber, acrylic rubber, and ethylene/propylene rubber, and nitrocellulose.

In the present disclosure, of these organic materials, organic materials having cross-linkable functional groups are preferable. Such cross-linkable functional groups have no specific limit. Specific examples thereof include, but are not limited to, hydroxyl group, carboxylic group, amide group, phosphoric acid group, thiol group, acetoacetyl group, and ether bonding.

The organic material having such a cross-linkable functional group is preferable in terms that the organic material is easily cross-linked to form a cured material (3D object). Moreover, as described above, modified polyvinyl alcohols are preferable in which the cross-linkable functional group is introduced in a molecule. In particular, polyvinyl alcohol modified by an acetoacetyl group is preferable. For example, if the polyvinyl alcohol contains an acetoacetyl group, due to the working of a metal in the cross-linking agent contained in the modeling liquid, the acetoacetyl group easily forms a complex three-dimensional network structure (cross-linked structure) via the metal, meaning that it has excellent cross-linking reactivity and extremely excellent bend strength.

As the polyvinyl alcohol modified by an acetoacetyl group, it is possible to use a single kind of the modified polyvinyl alcohol having different properties such as viscosity and saponification level or in combination. It is more preferable to use a polyvinyl alcohol modified by an acetacetyl group having an average degree of polymerization of from 400 to 1,100.

The organic material can be used alone or in combination. In addition, it is suitable to synthesize such an organic material and use products available on market. Specific examples of the products available on market include, but are not limited to, polyvinyl alcohol (PVA-205C, PVA-220C, manufactured by KURARAY CO., LTD.), polyacrylic acids (JURYMER® AC-10, manufactured by TOAGOSEI CO., LTD.), sodium polyacrylate (JURYMER® AC-103P, manufactured by TOAGOSEI CO., LTD.), acetoacetyl group-modified polyvinyl alcohol (Gohsenx Z-300, Gohsenx Z-100, Gohsenx Z-200, Gohsenx Z-205, Gohsenx Z-210, and Gohsenx Z-220, manufactured by The Nippon Synthetic Chemical Industry Co., Ltd.), copolymers of carboxyl group-modified polyvinyl alcohol (Gohsenx T-330, Gohsenx T-350, and Gohsenx T-330T, manufactured by The Nippon Synthetic Chemical Industry Co., Ltd.) and butanediol vinyl alcohol (Nichigo G-Polymer OKS-8041, manufactured by The Nippon Synthetic Chemical Industry Co., Ltd.), carboxymethyl cellulose (CELLOGEN 5A, manufactured by DKS Co. Ltd.), starch (Histard? PSS-5, manufactured by Sanwa Starch Co., Ltd.), and gelatin (beMatrix®, manufactured by Nina Gelatin Inc.).

The coverage film of the base material by the organic material preferably has an average thickness of from 5 nm to 1,000 nm, more preferably from 5 nm to 500 nm, furthermore preferably from 50 nm to 300 nm, and particularly preferably from 100 nm to 200 nm.

In the present disclosure, curing is conducted by a crosslinking agent, which makes it possible to reduce the thickness of a coverage film and also strike a balance between strength and accuracy even such a thin coverage film.

When the average thickness is 5 nm or greater, the strength of the cured object (3D object) of the powder material (layer) for 3D modeling formed by applying the modeling liquid to the powder material for 3D modeling is improved, which makes it free from problems such as losing shape during processing such as sintering conducted after forming the layer. When the thickness is 1,000 μm or less, the dimension accuracy of the cured object (3D object) of the powder material (layer) for 3D modeling manufacturing formed by applying the modeling liquid to the powder for 3D modeling is improved.

The average thickness can be obtained by, for example, embedding the powder material for 3D modeling in an acrylic resin, etc., exposing the surface of the base material by etching, etc., and thereafter measuring the thickness with a scanning tunneling microscope (STM), an atomic force microscope (AFM), or a scanning electron microscope (SEM).

The coverage factor (area ratio) of the surface of the base material by the organic material has no particular limit and can be suitably selected to a particular application. For example, it is preferably 15 percent or more, more preferably 50 percent or more, and particularly preferably 80 percent or more, When the coverage factor is 15 percent or more, the strength of the cured object (3D object) of the powder material (layer) for 3D modeling formed by applying the modeling liquid to the powder material for 3D modeling is sufficient, which makes it free from xproblems such as losing shape during processing such as sintering conducted after forming the layer. Also, the dimension accuracy of the cured object (3D object) of the powder material (layer) for 3D modeling manufacturing formed by applying the modeling liquid to the powder for 3D modeling is improved, The coverage factor is obtained by, for example, observing a photograph of the powder material for 3D modeling and calculating the average of the area ratio (percent) of the portion covered with the organic material to all the area of the surface of the base material (particle) about the powder material for 3D modeling photo-shot in the two-dimensional photograph. In addition, it is also possible to determine the coverage factor by element mapping according to energy dispersion type X-ray spectrocscopy such as SEM-EDS for the portion covered with the organic material.

Other Components

The other optional components are not particularly limited and can be selected to a suitable application. Examples thereof are a fluidizer, a filler, a leveling agent, and a sintering helping agent. Addition of a fluidizer to the powder material for 3D modeling is preferable to efficiently and easily form layers of the powder material for 3D modeling. It is preferable to contain a filler because voids etc. do not easily appear in an obtained cured object (3D object). It is preferable that the powder material for 3D modeling contains a leveling agent because the wettability of the powder material for 3D modeling ameliorates, thereby improving handling property, etc. It is preferable that the powder material for 3D modeling contains a sintering helping agent, which makes it possible to sinter an obtained cured object (3D object) at lower temperatures.

In embodiments according to the present disclosure, the coverage film of the powder material may further contain a surfactant. When a surfactant is added, the layer thickness is stable in the step of forming the layer of the powder material for 3D modeling, thereby forming a powder material layer having less roughness. This avoids a problem that the layer is not strong to prevent losing shape in the step of 3D modeling. This is particularly preferable when manufacturing a 3D object with accuracy. Namely, it is possible to obtain a 3D object having an excellent strength.

Preferable surfactants are as the following fluorine-containing surfactants.

Specific examples of the fluorine-containing surfactants include, but are not limited to, quaternary ammonium or bromonium salts having perfluoroalkenyl groups, perfluoroalkeynyl polyoxyethylene ether, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide compounds, polyoxyalkylene ether polymers having a perfluoro alkyl ether group at its side chain and sulfuric acid ester salts thereof, and fluorine-containing aliphatic polymer esters.

Specific examples of the products of the fluorine-containing surfactants available on market include, but are not limited to, FTERGENT 300, 310, 320, 251, 212M, 215M, and 250 (all manufactured by NEOS COMPANY LIMITED), SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, FC-431, and FC-4430 (all manufactured by SUMITOMO 3M); FT-110, FT-250, FT-251, and FT-400S (manufactured by NEOS COMPANY LIMITED); ZONYL FS-62, ZONYL FSA, ZONYL FSE, ZONYL FSJ, ZONYL FSP, ZONYL TBS, ZONYL UR, ZONYL FSO, ZONYL FSO-100, ZONYL FSN N, ZONYL FSN-100, ZONYL FS-300, and ZONYL FSK (all manufactured by E. I. du Pont de Nemours and Company); and POLY FOX PF-136A, PF-156A, and PF-151N (manufactured by OMNOVA SOLUTIONS INC.).

Manufacturing of Powder Material for 3D Modeling

The method of manufacturing the powder material for 3D modeling has no particular limit. For example, the base material is coated with the organic material according to a known coating method.

The method of covering the surface of the base material with the organic material has no particular limit. Known methods, for example, a tumbling fluidizing coating method, a spray drying method, a stirring mixing addition method, a tipping method, a kneader coating method, etc. are suitable.

In addition, these coverage methods can be executed by known various types of coating devices and granulating devices available on market.

Properties of Powder Material for 3D Modeling

The average particle diameter of the powder material for 3D modeling is not particularly limited and can be suitably determined to a particular application. The volume average particle diameter is preferably from 3 μm to 250 μm, more preferably from 3 μm to 200 μm, furthermore preferably from 5 μm to 150 μm, and particularly preferably from 10 μm to 85 μm.

When the average particle diameter is 3 μm or greater, the fluidity of the powder material is improved, the powder material layer is easily formed, so that the smoothness of the surface of the laminate layers ameliorates. As a consequence, the manufacturing efficiency and handling property, and dimension accuracy of the obtained 3D object tend to be better. In addition, when the average particle diameter is 250 μm or less, the space between the powder material particles is reduced, thereby decreasing the void ratio of a thus-obtained 3D object, which contributes to enhancement of the strength thereof. Accordingly, the average particle diameter is preferably from 3 μm or 250 μm to strike a balance between the dimension accuracy and the strength.

The particle size distribution of the powder material for 3D modeling is not particularly limited and can be suitably determined to a particular application.

As the property of the powder material for 3D modeling, the repose angle thereof is preferably 60 degrees or less, more preferably 50 degrees or less, and furthermore preferably 40 degrees or less.

When the repose angle is 60 degrees or less, it is possible to stably and efficiently place the powder material for 3D modeling on a desired position on a substrate.

The repose angle can be measured by, for example, powder property measuring device (powder tester PT-N type, manufactured by Hosokawa Micron Corporation.

The powder material for 3D modeling of the present disclosure can be applied to simple and efficient manufacturing of various shape forming objects and structures and also particularly suitably applied to the kit for 3D modeling, the modeling liquid of the present disclosure, the method of manufacturing a 3D object of the present disclosure, and the device for manufacturing a 3D object of the present disclosure described later.

By simply applying the modeling liquid of the present disclosure to the powder material for 3D modeling of the present disclosure, a structure having a complex steric form can be easily and efficiently manufactured with a good dimension accuracy. The thus-obtained structure is a cured material (3D object) having a sufficient hardness so that the structure is free from losing shape even when it is held by a hand or placed in or out of a mold or extra powder material for 3D modeling is removed by an air blow processing, meaning that excellent handling property is obtained. The cured material can be used as is. Also, it is possible to sinter the cured material to manufacture an object (sintered compact of 3D object). Furthermore, the object obtained after the sintering is free from unwanted voids, so that the object has a beautiful appearance easily.

The powder material for 3D modeling relating to embodiments of the present disclosure is evaluated by dissolving the coverage film of the powder material in a solvent and measuring the wetting tension of the coated surface formed again on a smooth surface. The measuring method of wetting tension is according to JIS K6768. The wetting tension reagent is available from Wako Pure Chemical Industries, Ltd., etc.

Each reagent set to have each corresponding surface tension is applied to the coated surface to have a thickness of 12 μm and the state of the liquid film is evaluated two seconds later. A case in which the liquid film is not broken but wet is evaluated as being wet. After evaluation with each reagent, the maximum wetting value of the reagents is determined as the wetting tension of the liquid film. Each reagent is applied to the liquid film by a wire bar, rolling pin, brush, etc.

It is possible to use any solvent capable of forming a film on a smooth surface as the solvent. However, it is suitable to avoid forming a film with defects such as warp, waving, etc. to a degree that the wetting tension of the surface of the film is not measurable.

Specifically, water is a suitable solvent when the material of the coverage film is polyvinyl alcohol.

The measuring method of wetting tension is described in detail later.

Modeling Liquid

The modeling liquid of the present disclosure is used in the method of manufacturing a three-dimensional object of the present disclosure and contains a cross-linking agent to cross-link with the organic material, a medium (solvent) to dissolve the organic material, a component to accelerate the dissolution, and other optional components.

When the modeling liquid is applied to the organic material, the organic material is dissolved therein and cross-links due to the cross-linking agent contained in the modeling liquid.

Medium (Solvent)

No particular limit is applied to the medium (solvent). Specific examples thereof include, but are not limited to, aqueous media such as water, ethers of alcohols such as ethanol, and ketones, aliphatic hydrocarbons, ether-based solvents such as glycol ether, ester-based solvents such as ethylacetate, ketone-based methylethyl ketone, and higher alcohols. Of these, considering burden on environment and discharging stability (less viscosity change over time) while applying a modeling liquid by an inkjet method, an aqueous medium is preferable and water is more preferable. As the aqueous medium, water may contain a small quantity of components such as the alcohol other than water.

In addition, when the medium of the modeling liquid is an aqueous medium, the organic material preferably contains a water soluble material as the main component.

Cross-Linking Agent

By applying the solution to the powder material for 3D modeling, the resin in the powder material for 3D modeling is dissolved in the solvent in the solution. Therefore, the base material particles adhere to each other as water as the solvent dries, so that a 3D object is formed. While forming the object, if the solution contains a cross-linking agent, a cross-linking structure is formed with the resin, thereby further improving the strength of the obtained 3D object.

The cross-linking agent has no particular limit, for example, the agent capable of conducting cross-linking reaction with the functional group of a resin is suitable, preferable to select an agent from organic metal salts to a particular application.

Examples of the organic metal salts are metal complexes, zirconia-based cross-linking agents, titanium-based cross-linking agents, water soluble organic cross-linking agents, and chelating agents.

Specific examples of the zirconia-based cross-linking agents include, but are not limited to, zirconium oxychloride and ammonium zirconium carbonate.

Specific examples of the titanium-based cross-linking agents include, but are not limited to, titanium acylate and titanium alkoxide.

Specific examples of the chelating agents include, but are not limited to, organic titanium chelate and organic zirconium chelate.

These can be used alone or in combination.

Furthermore, organic metal salts that ionize cation metal having di or higher valent in water are preferable.

Specific examples of the organic metal salts include, but are not limited to, zirconium oxychloride octahydrate (quadrivalent), titanium lactate ammonium salt (quadrivalent), aluminum subacetate (trivalent), ammonium salt of zirconium carbonate (quadrivalent), titanium triethanol animate (quadrivalent), glyoxyl acid salts, and zirconium lactate ammonium salts.

In addition, these are available on market. Specific examples of such products include, but are not limited to, zirconium oxychloride octahydrate (acid zirconium chloride, manufactured by DAIICHI KIGENSO KAGAKU KOGYO Co., LTD.), aluminum hydroxide (manufactured by Wako Pure Chemical Industries, Ltd.), magnesium hydroxide (manufactured by Wako Pure Chemical Industries, Ltd.), titanium lactate ammonium salts (Orgatix TC-300, manufactured by Matsumoto Fine Chemical Co. Ltd.), zirconium lactate ammonium salts (Orgatix ZC 300, manufactured by Matsumoto Fine Chemical Co. Ltd.), aluminum subacetate (manufactured by Wako Pure Chemical Industries, Ltd.), bisvinyl sulfone compound (VS-B (K-FJ-C), manufactured by FUJIFINE Chemical CORPORATION), carboxylic acid zirconium oxide ammonium salt (Zircosol AC-20, manufactured by DAIICHI KIGENSO KAGAKU KOGYO CO., LTD.), and titanium triethanol aminate (Orgatix TC-400, manufactured by Matsumoto Fine Chemical Co. Ltd.). When the degree of valent of the metal in the metal salt mentioned above is di- or higher, it is possible to improve the cross-linking strength so that a thus-obtained 3D modeling product has desired strength.

In addition, as the ligand of the cation metal, lactic acid ion is preferable in terms of discharging stability (storage property over time) of the modeling liquid.

When the ligand of the cation metal is a carboxylic acid ion, for example, carboxylic acid zirconium ammonium, self polymerization reaction occurs in an aqueous solution, so that the property of a cross-linking agent tends to change. Therefore, in terms of discharging stability, it is preferable to use a cross-linking agent having lactic acid ion as the ligand of the cation. However, by adding a chelating agent such as gluconic acid and triethanol amine, self polymerization reaction of carboxylic acid zirconium ammonium in an aqueous solution can be subdued and discharging stability is improved.

Other Components

The other components are selected taking into account the conditions such as the kind of device to apply the modeling liquid, frequency of usage, and quantity. For example, when the modeling liquid is applied by an inkjet method, it is suitable to make a selection considering the impact of clogging of the nozzle head in an inkjet printer. As the other components, for example, preservatives, anti-septic agents, stabilizers, and pH regulators are suitable.

The method of preparing the modeling agent is not particularly limited and can be selected to a particular application. For example, a method of dissolving the cross-linking agent and the other optional components in the aqueous medium is suitable while adding and mixing the other optional other components.

The content (concentration) of the cross-linking agent in the modeling liquid is not particularly limited and can be suitably determined to a particular application. For example, the content of the cross-linking agent is preferably from 0.1 parts by mass (percent by mass) to 50 parts by mass (percent by mass) to 100 parts by mass of the organic material, more preferably from 0.5 part by mass (percent by mass) to 40 parts by mass, and particularly preferably from 1 part by mass to 35 parts by mass.

When the concentration is 0.1 percent by mass or greater, the strength of the cured object (3D object) of the powder material (layer) for 3D modeling formed by applying the solution to the powder material for 3D modeling is improved, which makes it free from problems such as losing shape during processing such as sintering conducted after forming the layer. When the concentration is 50 percent by mass or less, the dimension accuracy of the cured object (3D object) of the powder material (layer) for 3D modeling formed by applying the modeling liquid to the powder material (layer) for 3D modeling is improved.

Kit for 3D Modeling

The kit for 3D modeling of the present disclosure contains the powder material for 3D modeling of the present disclosure, the modeling liquid, and other optional components.

In the kit for 3D modeling, it is not necessary to contain the cross-linking agent in the modeling liquid. It may be contained as a solid form. Also, it is possible to constitute a kit in which the cross-linking agent is mixed with the aqueous medium to prepare the modeling liquid when used.

Since the kit for 3D modeling of the present disclosure can be suitably used for various shape-forming objects and structures. The kit can be particularly suitably applied to the method of manufacturing a 3D object of the present disclosure, the device for manufacturing a 3D object of the present disclosure, and the 3D object obtained in the present disclosure.

By using the kit for 3D modeling of the present disclosure, a structure (object) having a complex steric form can be easily and efficiently manufactured with a good dimension accuracy by reacting the powder material for 3D modeling with the modeling liquid followed by optional drying. The thus-obtained structure is a cured material (3D object) having a sufficient hardness so that the structure is free from losing shape even when it is held by a hand or placed in or out of a mold or extra powder material for 3D modeling is removed by an air blow processing, meaning that excellent handling property is obtained. The cured material can be used as is. Also, it is possible to sinter the cured material to manufacture an object (sintered compact of 3D object). Furthermore, the object obtained after the sintering is free from unwanted voids, so that the object has a beautiful appearance easily.

Three-dimensional (3D) Object

The three-dimensional (3D) object obtained in the present disclosure is a cured object obtained by applying the modeling liquid to the powder material for 3D modeling of the present disclosure or a cured object obtained by applying the modeling liquid to the powder material for 3D modeling in the kit for 3D modeling of the present disclosure and is used as a cured object for sintering to manufacture an object (sintered compact of the 3D object) by sintering.

The 3D object is obtained by simply applying the modeling liquid to the powder material for 3D modeling but has a sufficient strength. In the 3D object, the base material is densely (high filling rate) present and a very minute amount of the organic material is present around the base material. Therefore, unlike a typical cured object of powder or particles obtained by using an adhesive, etc., when a sintered object (sintered compact) is obtained after sintering, undesired voids (marks of removed grease) are not present since the amount of volatile organic component (removal of grease) is reduced. As a consequence, the sintered compact has a beautiful appearance.

The strength of the 3D object is, for example, such that no losing shape, etc. is caused by abrading the surface or no cracking occurs when the object is subject to air blow treatment using an air gun having a nozzle diameter of 2 mm and an air pressure of 0.3 MPa at 5 cm away from the object.

Method of Manufacturing 3D Object and Device for Manufacturing 3D Object

The method of manufacturing a 3D object of the present disclosure includes forming a powder material layer, curing the powder material layer, and other optional steps such as sintering.

The 3D object is manufactured by repeating the steps of forming the powder material layer and curing the powder material layer.

The device for manufacturing a 3D object of the present disclosure includes a powder material layer forming device, a solution applying device, a powder material containing unit (container) containing the powder material, and a modeling liquid containing unit (container) containing a modeling liquid. It may further optionally include a modeling liquid supplying device, a sintering device, etc.

Powder Material Layer Forming Step and Powder Layer Forming Device

The step of forming the powder material layer includes forming a layer of the powder material for 3D modeling containing the base material covered with the organic material.

The device of forming the powder material layer forms a layer of the powder material for 3D modeling containing the base material covered with the organic material.

It is preferable to form the powder material layer on a substrate.

Substrate

The substrate is not particularly limited and can be selected to a particular application. Preferably, the powder material for 3D modeling can be placed on the substrate. For example, a known platform or base plate having a surface on which the powder for 3D modeling is placed is suitably used.

The surface of the substrate, that is, the surface on which the powder material for 3D modeling powder is placed may be smooth, coarse, plane, or curved plane, it is preferable that the surface has a low affinity with the organic material when the organic material in the powder material for 3D modeling is dissolved and cross-linked by the cross-linking agent.

If the affinity of the surface with the dissolved and cross-linked organic material is lower than that of the base material with the dissolved and cross-linked organic material, it is easy to take the obtained 3D object out of the surface.

Forming Powder Material Layer

The method of placing the powder material for 3D modeling on the substrate is not particularly limited. For example, a method using a known counter rotation mechanism (counter roller) for use in a selective laser sintering method, a method of extending the powder for 3D modeling to a thin layer using a member such as a brush, a roller, and a blade, a method of extending the powder material for 3D modeling to a thin layer by pressing the surface of the powder for 3D modeling using a pressure member, and a method of using a known powder laminating device (device for manufacturing a 3D object) are suitable as the method of placing the powder for 3D modeling in a thin layer.

Using the counter rotation mechanism (counter roller), the brush, the blade, or the pressing member, a thin layer of the powder material for 3D modeling can be formed on a substrate, for example, in the following manner:

In an outer frame (also referred to as "form", "hollow cylinder" "tubular structure", etc.), the powder material for 3D modeling is placed by the counter rotation mechanism (counter roller), the brush, the roller or blade, the pressing member, etc. onto the substrate arranged to move up and down slidably along the inside wall of the outer frame. At this point, to use a substrate movable up and down in the outer frame, the substrate is positioned to be slightly lower than the upper open mouth of the outer frame. That is, while placing the substrate with a layer thickness of the powder material for 3D modeling below the open mouth, the powder material for 3D modeling is placed on the substrate. A thin layer of the powder material for additive manufacturing is thus-placed on the substrate.

By reacting the modeling liquid with the thin layer of the powder for 3D modeling placed on the substrate, the thin layer is cured (the step of curing the powder material layer described above).

The powder material for 3D modeling is placed on the thin layer of the thus-obtained cured object in the same manner as described above and thereafter, when the modeling liquid is applied to the powder material layer formed on the thin layer, the powder material layer is cured. The curing at this point of time occurs not only to the powder layer formed on the thin layer but also to the border between the cured material layer and the thin layer (cured object) that is already cured and present below. As a consequence, the cured object (3D modeling object) is obtained which has a thickness corresponding to about the two layers of the powder material (layer) for 3D modeling placed on the thin layer.

In addition, it is possible to automatically and simply place a thin layer of the powder material for 3D modeling on the substrate by using the known powder laminating device (device for manufacturing a 3D object) described above. A typical powder material laminating device has a recoater to laminate the powder for 3D modeling, a movable supplying tank to supply the powder for 3D modeling onto the substrate, and a movable modeling tank to form a thin layer of the powder for 3D modeling and laminate the thin layers.

In the powder laminating device, the surface of the supplying tank can be elevated slightly above the surface of the modeling tank by moving up the supplying tank, moving down the modeling tank, or both. In addition, the powder material for 3D modeling is arranged to form a thin layer using the recoater from the side of the supplying tank and by repeating moving the recoater, the thin layers of the powder material for 3D modeling are laminated.

The thickness of the powder material layer for 3D modeling is not particularly limited. For example, the average thickness of a single layer is preferably from 30 μm to 500 μm and more preferably from 60 μm to 300 μm.

When the thickness is 30 μm or more, the strength of the cured object (3D object) of the powder material (layer) for 3D modeling formed by applying the modeling liquid to the powder material for 3D modeling is sufficient, which makes it free from problems such as losing shape during processing such as sintering conducted after forming the layer. When the thickness is 500 μm or less, the dimension accuracy of the cured object (3D object) of the powder material (layer) for 3D modeling formed by applying the modeling liquid to the powder material for 3D modeling is improved.

Incidentally, the average thickness has non particular limit and can be measured according to a known method.

Step of Applying Modeling Liquid to Powder Material Layer

The step of applying the modeling liquid to the powder material layer includes applying the modeling liquid containing the cross-linking agent to cross-link with the organic material to the powder material layer formed in the step of forming the powder material layer.

The method of applying the modeling liquid to the powder material layer is not particularly limited and can be selected to a particular application. For example, a dispenser method, a spray method, or an inkjet method is suitable. To execute such a method, a known device is suitably used as the modeling liquid applying device.

Of these, the dispenser method has an excellent quantitative property but the application area is small. The spray method is capable of simply forming a fine discharging material, has a wide application area, and demonstrates excellent applicability but the quantitative property thereof is poor so that powder material scatters due to the spray stream. For this reason, in the present disclosure, the inkjet method is particularly preferable. The inkjet method has a good quantitative property in comparison with the spray method and a wider application area in comparison with the dispenser method. Accordingly, the inkjet method is preferable to accurately and efficiently form a complex shape.

When utilizing the inkjet method, the modeling liquid applying device has a nozzle to apply the modeling liquid to the powder material layer by the inkjet method. As the nozzle, nozzles (discharging head) in the known inkjet printers can be suitably used. In addition, it is possible to use the inkjet printer as the modeling liquid applying device. A specific example of the inkjet printer is SG7100, manufactured by Ricoh Company Ltd. It is preferable to use the inkjet printer because the head portion can drip a large amount of the ink at once and the application area is large, which leads to improvement of high application performance.

In the present disclosure, even when an inkjet printer capable of accurately and efficiently applying the modeling liquid is used, the nozzles and the head of the nozzles are free of clogging or corrosion since the modeling liquid contains no solid material such as particles or highly viscous polymer such as a resin. In addition, when the modeling liquid is applied onto the powder material layer for 3D modeling, it efficiently permeates into the organic material in the powder material for 3D modeling. Accordingly, the manufacturing efficiency of a 3D object is excellent and an unexpected volume increase can be avoided since polymer components such as resins are not applied. Consequently, a cured object having a good dimension accuracy can be easily and efficiently obtained in a short time.

The cross-linking agent can also serve as a pH regulator in the modeling liquid. When the modeling liquid is applied to the powder material layer for 3D modeling according to the inkjet method, the pH of the modeling liquid is preferably from 5 (weak acidity) to 12 (basic) and more preferably from 8 to 10 (weak basic) in terms of prevention of clogging and corrosion of nozzle head portions of nozzles to be used. To regulate the pH, known pH regulators may be used.

Powder Material Containing Unit (Container)

The powder material containing unit (container) contains the powder material for 3D modeling. The size, forms, materials, etc. thereof are not particularly limited. For example, a storage tank, a bag, a cartridge, or a tank is suitably selected to a particular application.

Modeling Liquid Containing Unit (Container)

The modeling liquid containing unit (container) contains the modeling liquid. The size, form, material, etc. thereof are not particularly limited. For example, a storage tank, a bag, a cartridge, or a tank is suitably selected to a particular application.

Other Process and Other Device

The other processes include a drying process, a sintering process, a surface protection treatment process, a coating (application) process, etc.

The other devices include a drying device, a sintering device, a surface protection treatment device, a coating device (applicator), etc.

The drying process is to dry a cured object (3D object) obtained in the step of curing the powder material layer. In the step of drying and curing, by removing moisture content contained in the cured material, the 3D object is cured by the cross-linking reaction between the organic material and the cross-linking agent. In this step, organic materials may be optionally further removed. For example, known driers can be used as the drying device.

The sintering process is to sinter a cured material (3D object) formed in the step of curing the powder material layer. According to this sintering step, the cured object is made as an integrated shape-forming object (sintered compact of the 3D modeling) of metal or ceramic. For example, a known sintering furnace can be used as the sintering device.

The surface protection treatment process is to form a protection layer on a cured object (3D object) formed in the step of curing the powder material layer.

By executing the surface protection treatment process, the surface of the cured object (3D object) has durability to a degree that, for example, the object can be used as is.

Specific examples of the protection layer include, but are not limited to, a water-resistant layer, a weather resistant layer, a light resistant layer, a heat insulation layer, and a gloss layer. Specific examples of the surface protection treatment device include, but are not limited to, known surface protection treatment devices such as a spraying device and a coating device.

The coating step is to conduct coating for a cured object (3D object) formed in the step of curing the powder material layer. By the coating process, the cured object (3D modeling) is colored in a desired color. Specific examples of the coating device include, but are not limited to, known coating devices using a spray, a roller, a brush.

Figure 1:
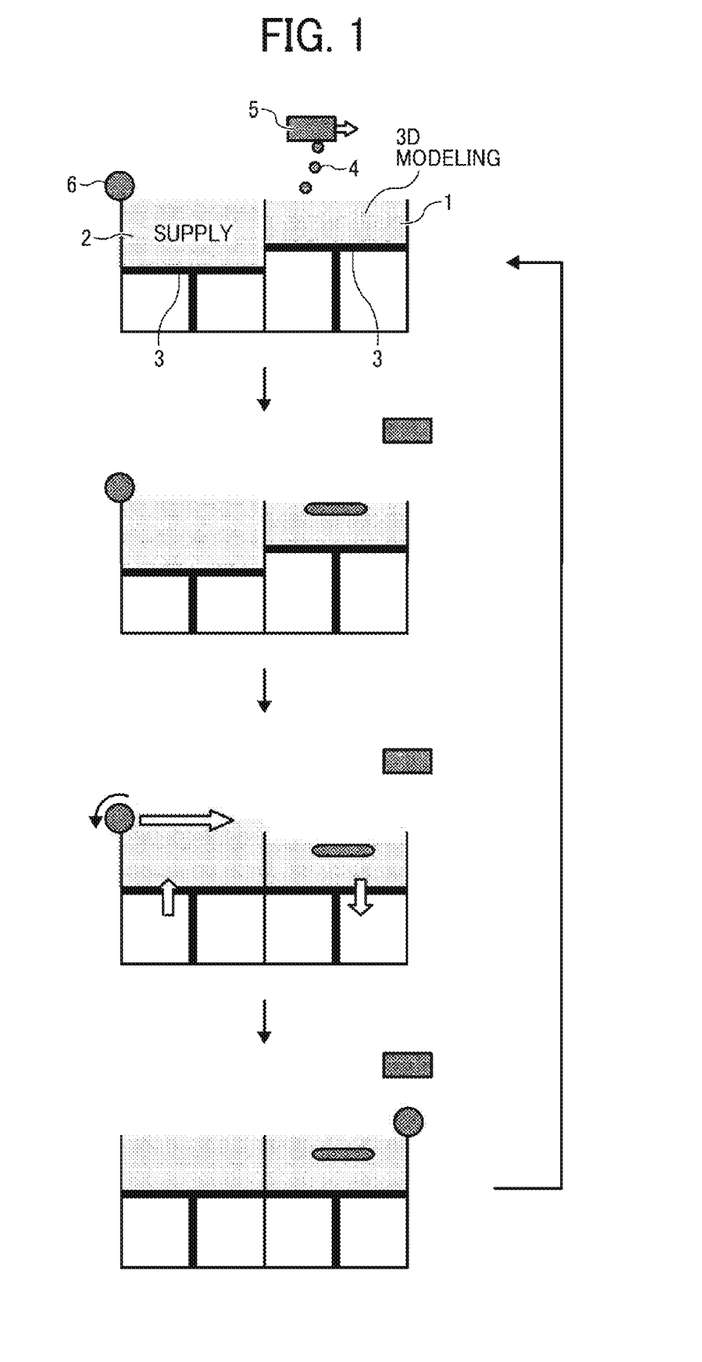
FIG. 1 is a schematic diagram illustrating an example of a device for manufacturing a 3D object from powder according to an embodiment of the present invention.

FIG. 1 is a diagram illustrating an example of the device for manufacturing a 3D object (from powder) of the present disclosure. The powder 3D modeling device (device for manufacturing a 3D object from powder) illustrated in FIG. 1 includes a powder storage tank 1 for 3D modeling (powder material layer forming device) and a powder storage tank 2 (powder material containing unit) for supplying the powder material. Each of these powder storage tanks has a stage 3 movable up and down and places the powder material for 3D modeling on the stage 3.

The powder 3D modeling device has an inkjet head 5 (modeling liquid applying device) over the storage tank 1 to discharge a modeling liquid 4 (aqueous medium) toward the powder material for 3D modeling in the powder storage tank 1. Moreover, it supplies the powder material for 3D modeling from the powder storage tank 2 to the powder storage tank 1 and also has a recoating mechanism (hereinafter referred to as recoater) 6 to smooth the surface of the powder material (layer) for 3D modeling in the powder storage tank 1.

The modeling liquid 4 is dripped from the inkjet head 5 onto the powder material for 3D modeling of the powder storage tank 1. At this point in time, the position where the modeling liquid 4 is dripped is determined by two-dimensional image data (slice data) obtained by slicing a desired 3D shape into multiple plane layers.

After completing depiction corresponding to an amount of a single layer, the stage 3 for the powder storage tank 2 is elevated while the stage 3 for the storage tank 1 is lowered.

The amount of the powder for 3D modeling corresponding to the difference is moved to the powder storage tank 1 by the recoater (powder material laminating device) 6.

This is how a new layer of the powder material for 3D modeling is formed on the surface of the previously depicted powder layer for 3D modeling. The single layer of the powder material for 3D modeling has a thickness of from about several tens µm to about several hundreds µm.

Furthermore, depiction is conducted on the newly-formed powder material layer for 3D modeling based on the slice data for the second layer (new layer). A series of these processes are repeated to obtain a 3D object. Subsequent to heating and drying by a heater, a final 3D object is obtained.

Figure 2:
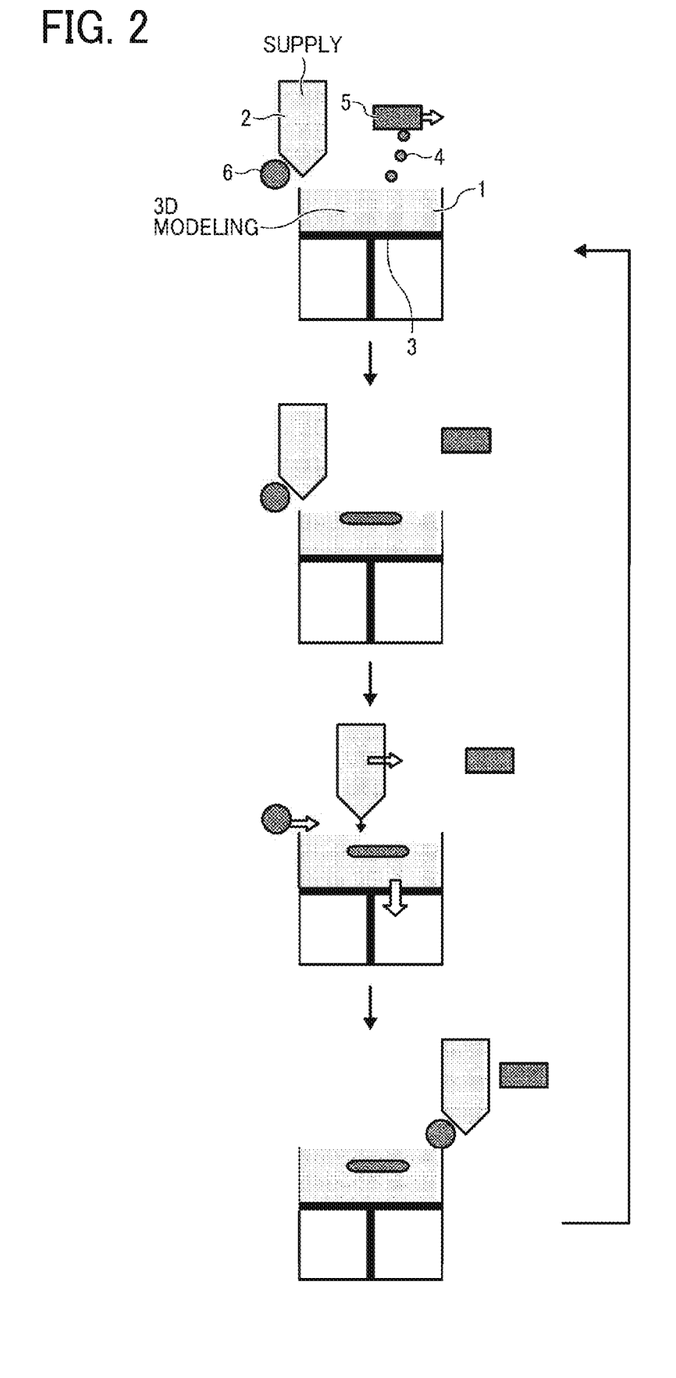
FIG. 2 is a schematic diagram illustrating another example of a device for manufacturing a 3D object from powder according to an embodiment of the present invention

FIG. 2 is a diagram illustrating another example of the device for manufacturing a 3D object (from powder) of the present disclosure. The device illustrated in FIG. 2 operates on the same principle as that illustrated in FIG. 1. However, both have different supplying mechanisms. That is, the powder storage tank 2 is provided over the powder storage tank 1.

When the depiction of the first layer is finished, the stage 3 of the powder storage tank 1 is lowered in a predetermined amount and the powder material for 3D modeling is dropped from the powder storage tank 2 to the powder storage tank 1 while moving the powder storage tank 2 to form a new powder material layer for 3D modeling. Thereafter, the recoater 6 compresses the powder material for 3D modeling to increase the bulk density and also smooth the height of the powder material layer for 3D modeling.

According to the device for manufacturing a 3D object illustrated in FIG. 2, the configuration of the device is compact in comparison with the configuration illustrated in FIG. 1 in which the two powder storage tanks are arranged side by side.

According to the method of manufacturing a 3D object and the device for manufacturing a 3D object of the present disclosure, a 3D object having a complicated form and good dimension accuracy can be simply and efficiently manufactured without losing shape before sintering, etc., by using the powder material for 3D modeling of the present disclosure or the kit for 3D modeling of the present disclosure.

Since each of the thus-obtained 3D modeling object and the sintered compact has a sufficient strength and excellent dimension accuracy, representing fine roughness and curved planes, the object has aesthetic aspect with high quality and can be suitably used for various purposes.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Example 1

Preparation of Powder Material 1 for 3D Modeling
Preparation of Surfactant Added Coating Liquid 1

As illustrated in Table 1 shown later, 114 parts by mass of water was mixed with 6 parts by mass of polyvinyl alcohol (PVA-205C, average molecular weight: 22,000, manufactured by KIJRARAY CO., LTD.), which was a water soluble resin serving as the organic material No. 1 shown in Table 1. Thereafter, the mixture was stirred for one hour using a three one motor BL600 (manufactured by SHINTO Scientific Co., Ltd.) while being heated at 80 degrees C. in a water bath to dissolve the polyvinyl alcohol in water. As a result, 120 parts by mass of an aqueous solution of 5 percent by mass polyvinyl alcohol was prepared.

The thus-obtained preparation liquid was referred to as [Coating liquid 1].

In addition, 90 parts by weight of ethanol was added to and stirred with 10 parts by weight of FTERGENT 310 (manufactured by NEOS COMPANY LIMITED) to prepare 100 parts by weight of 10 percent by mass [Surfactant solution 1].

0.12 parts by mass of [Surfactant solution 1] was added to 120 parts by mass of [Coating liquid 1] to obtain [Surfactant added coating liquid 1].

The viscosity of 4 percent by mass aqueous solution of the polyvinyl alcohol mentioned above at 20 degrees C. was from 5.0 mPa·s to 6.0 mPa·s as measured by a viscometer (DV-E VISCOMETER HADVE 115 TYPE, manufactured by Brookfield Engineering) as shown in Table 1.

Coating of Surfactant Added Coating Liquid 1 to Surface of Base Material

Using a coating device (MP-01, manufactured by POWREX CORPORATION) available on market, 100 parts by mass of powder of stainless steel (SUS316L) (PSS316L, volume average particle diameter: 41 µm, manufactured by SANYO SPECIAL STEEL Co., Ltd.) as the base material (No. 1 in Table 1) was coated with [Surfactant added coating liquid 1] in such a manner that the coverage thickness (average thickness) shown in Table 1 was obtained. Sampling was arbitrarily made in the middle of coating to suitably control the time and interval of the coating in order that the coverage thickness (average thickness) and the coverage factor (percent) of the [Coating liquid 1] shown in Table 1 were obtained.

As a result, [Powder material 1 for 3D modeling] was obtained. The conditions of the coverage thickness and the measuring method of the surface coverage factor, and the coating conditions described above were shown below.

Coverage Thickness (Average Thickness)

A sample for observation for coverage thickness (average thickness) was prepared by polishing the surface of [Powder material 1 for 3D modeling] by emery paper and thereafter slightly polishing the surface with a wet cloth to dissolve the water soluble resin portion. Next, the border portion between the base material and the water soluble resin portion exposed to the surface was observed by a field-emission-type scanning electron microscope (FE-SEM) and the border portion was measured as the coverage thickness. Thereafter, the average of ten measured points was obtained and determined as the coverage thickness (average thickness).

The coverage thickness is 100 nm as shown in Table 2.

Surface Coverage Factor

Using a field-emission-type scanning electron microscope (FE-SEM). Energy Selective Backscatter (EsB) was taken under the following conditions with a field of vision in which the number of [Powder material 1 for 3D modeling] was around ten in an image followed by image processing using Image J software for binarization. The coverage portion was black while the base material was white. The rate of {black portion area/(black portion area+white portion area)} in a particle was obtained according to the following mathematical formula:

{black portion area/(black portion area+white portion area)}*100

10 particles were measured and the average of the 10 particles was determined as the surface coverage factor (percent).

The surface coverage factor was 100 percent as shown in Table 2.

SEM Observation Condition
Signal: ESB (backscattered electron image)
EHT: 0.80 kV
ESB Grid: 700 V
WD: 3.0 mm
Aperture Size: 30.00 μm
Contrast: 80 percent
Magnification: set for each sample in order to have the number of particles around ten in the horizontal direction of screen Coating Conditions
Spray setting
Nozzle diameter: 1.2 mm
Coating liquid discharging pressure: 4.7 Pass
Coating liquid discharging speed: 3 g/min.
Atomize air amount: 50 NL/min
Rotor setting
Rotation speed: 60 rpm
Number of rotation: 400 percent
Air stream setting
Air supply temperature: 80 degrees C.
Air supply amount: 0.8 m$^3$/min.
Bug filter shaking pressure: 0.2 MPa
Bug filter shaking time: 0.3 seconds
Bug filter interval: 5 seconds
Coating time: 40 minutes For the obtained [Powder material 1 for 3D modeling], the average particle diameter was measured by using a particle diameter measuring device (Microtrac HRA, manufactured by NIKKISO CO., LTD.) available on market. It was 43 μm as shown in Table 2, In addition; the repose angle was measured by a repose angle measuring device (Powder tester PT-N type, manufactured by Hosokawa Micron Corporation) to represent the fluidity of [Powder material 1 for 3D modeling]. The angle was 32 degrees as shown in Table 2. As the measuring value of the repose angle increases, fluidity tends to be inferior, 100 parts of water was added to 100 parts of [Powder material 1 for 3D modeling] and the mixture was heated to 90 degrees C. while being stirred. Supernatant solution was obtained in the upper portion. A silicone resin bank having a height of 10 mm was made on a glass plate. The supernatant solution was poured inside the bank in order that the liquid was not spilled over the bank. The liquid was left still for one week at 23 degrees C. and 50 percent moisture. A film having an area of 50 mm×50 mm formed on the smooth surface of the glass plate was obtained by carefully removing the bank. The liquid mixtures (liquids for each surface tension) for wetting tension test (available from Wako Pure Chemical Industries, Ltd.) were evaluated for this film and the results were determined as the wetting tension of each powder material for 3D modeling.

The evaluation results of wetting tension were shown in Table 1.

Preparation of Modeling Liquid 1

70 parts of water, 30 parts of 3-methyl-1,3-butane diol (manufactured by Tokyo Chemical Industry Co. Ltd.) serving as fluidity adjuster, and 0.1 parts of zirconium oxychloride octahydrate (acid zirconium chloride, manufactured by DAIICHI KIGENSO KAGAKU KOGYO CO., LTD.) serving as cross-linking agent were dispersed for 30 minutes by using a HOMOMIXER to prepare [Modeling liquid 1] (Modeling liquid No. 1 in Table 2).

Forming of 3D (Three-dimensional) Object 1

Using the thus-obtained [Powder material 1 for 3D modeling], [Modeling liquid 1], and a form printing pattern of a size (length: 70 mm, width: 12 mm), [3D object 1] and [3D object 1 (sintered compact)] were manufactured according to the following steps of 1 to 4.

1. Using a known powder laminating device as illustrated as in FIG. 1, [Powder material 1 for 3D modeling] was transferred from the powder storage tank to the 3D modeling tank to form a thin layer of [Powder material 1 for 3D modeling] having an average thickness of 100 μm on a substrate, 2. Next, [Modeling liquid 1] was applied (discharged) from the nozzles of a known inkjet discharging head to the surface of the thus-formed thin layer of [Powder material 1 for 3D modeling] to dissolve the polyvinyl alcohol in the water contained in the [Modeling liquid 1], thereby cross-linking the polyvinyl alcohol by the working of the cross-linking agent (oxychloride octahydrate) contained in the [Modeling liquid 1].

3. The operations of the steps 1 and 2 described above were repeated to sequentially laminate the thin layers of [Powder material 1 for 3D modeling] until the total average thickness reached 3 mm. Using a drier, the resultant was dried at 50 degrees C. for four hours and thereafter at 100 degrees C. for ten hours to obtain [3D object 1].

4. [3D object 1] obtained in the step 3 described above was heated to 400 degrees in a nitrogen atmosphere for defatting. Furthermore, the resultant was subject to sintering treatment at 1,300 degrees C. in a sintering furnace in vacuum condition. As a result, [3D object 1 (sintered object)] having a beautiful surface was obtained.

This [3D object 1 (sintered object)] was a completely integrated stainless structure (metal lump) and not broken at all when slammed down on a hard floor.

Losing shape did not occur to the thus-obtained [3D object 1] when extra [Powder material 1 for 3D modeling] was removed by air blow, meaning that the object had excellent strength and dimension accuracy.

The deviation of the thickness of the thin layer formed using a 3D modeling device was evaluated according to the following criteria:

The results are shown in Table 2.

Deviation Evaluation on Thickness of Thin Layer
A: Deviation of thickness: 15 percent or less
B: Deviation of thickness: Greater than 15 percent to 30 percent
C: Deviation of thickness: Greater than 30 percent to 50 percent D: Deviation of thickness: Greater than 50 percent (e.g., increase and decrease surpassing 50 μm when the layer thickness was 100 μm,

Example 2

[3D object 2] having the average thickness and the surface coverage factor shown in Table 1 was manufactured and evaluated in the same manner as in Example 1 except that the coating time was changed to two minutes. The results are shown in Tables 1 and 2.

Example 3

[3D object 3] having the average thickness and the surface coverage factor shown in Table 1 was manufactured and evaluated in the same manner as in Example 1 except that the coating time was changed to 200 minutes. The results are shown in Tables 1 and 2.

Example 4

[3D object 4] was manufactured in the same manner as in Example 2 except that 3.0 parts of zirconium oxychloride octahydrate (acid zirconium chloride, manufactured by DAIICHI KIGENSO KAGAKU KOGYO CO., LTD.) serving as cross-linking agent was used to prepare [Modeling liquid 2] and evaluated in the same manner as in Example 1. The results are shown in Tables 1 and 2.

Example 5

[3D object 5] was manufactured in the same manner as in Example 2 except that 3.5 parts of zirconium oxychloride octahydrate (acid zirconium chloride, manufactured by DAIICHI KIGENSO KAGAKU KOGYO CO., LTD.) serving as cross-linking agent was used to prepare [Modeling liquid 3] and evaluated in the same manner as in Example 1, The results are shown in Tables 1 and 2.

Example 6

[3D object 6] was manufactured in the same manner as in Example 2 except that the water soluble resin was changed to polyvinyl alcohol (PVA-220C, manufactured by KURARAY CO., LTD.) to manufacture [Powder material 4 for 3D modeling] and evaluated in the same manner as in Example 1. The results are shown in Tables 1 and 2.

Example 7

[3D object 7] was manufactured in the same manner as in Example 2 except that the water soluble resin was changed to acrylic acid (JURYMER® AC-10P, manufactured by TOAGOSEI CO., LTD.) and the cross-linking agent was changed to aluminum hydroxide (manufactured by Wako Pure Chemical Industries, Ltd.) to manufacture [Powder material 5 for 3D modeling] and evaluated in the same manner as in Example 1. The results are shown in Tables 1 and 2.

Example 8

[3D object 8] was manufactured in the same manner as in Example 7 except that the water soluble resin was changed to polymer of sodium acrylate (JURYMER® AC-103P, manufactured by TOAGOSEI CO., LTD.) to manufacture [Powder material 6 for 3D modeling] and evaluated in the same manner as in Example 1. The results are shown in Tables 1 and 2.

Example 9

[3D object 9] was manufactured in the same manner as in Example 8 except that the cross-linking agent was changed to magnesium hydroxide (manufactured by Wako Pure Chemical Industries, Ltd.) and evaluated in the same manner as in Example 1. The results are shown in Tables 1 and 2.

Example 10

[3D object 10] was manufactured and evaluated in the same manner as in Example 1 except that the water-soluble resin was changed to acetoacetyl group modified polyvinyl alcohol (GOHSEFIMER Z-100, manufactured by The Nippon Synthetic Chemical Industry Co., Ltd.) and the cross-linking agent was changed from 0.1 parts of zirconium oxychloride octahydrate (acid zirconium chloride, manufactured by DAIICHI KIGENSO KAGAKU KOGYO CO., LTD.) to 5 parts of an ammonium salt of zirconium carbonate (Zircosol AC-20, manufactured by DAIICHI KIGENSO KAGAKU KOGYO CO., LTD.) to prepare [Powder material 7 for 3D modeling]. The results are shown in Tables 1 and 2.

Example 11

[3D object 11] was manufactured in the same manner as in Example 10 except that the water soluble resin was changed to carboxyl group modified polyvinyl alcohol (Gohsenx Z-200, manufactured by The Nippon Synthetic Chemical Industry Co., Ltd.) to manufacture [Powder material 8 for 3D modeling] and evaluated in the same manner as in Example 1. The results are shown in Tables 1 and 2.

Example 12

[3D object 12] was manufactured in the same manner as in Example 10 except that the water soluble resin was changed to butane diol polyvinyl alcohol polymer (Nichigo G-Polymer OKS-8041, manufactured by The Nippon Synthetic Chemical industry Co., Ltd.) to manufacture [Powder material 9 for 3D modeling] and evaluated in the same manner as in Example 1. The results are shown in Tables 1 and 2.

Example 13

[3D object 13] was manufactured in the same manner as in Example 1 except that the water soluble resin was changed to carboxymethyl cellulose sodium (CELLOGEN 5A, manufactured by DKS Co. Ltd.) and the cross-linking agent was changed to basic aluminum acetate (manufactured by Wako Pure Chemical Industries, Ltd.) to manufacture [Powder material 10 for 3D modeling] and evaluated in the same manner as in Example 1. The results are shown in Tables 1 and 2,

Example 14

[3D object 14] was manufactured in the same manner as in Example 13 except that the water soluble resin was changed to carboxymethyl cellulose sodium (CELLOGEN 6A, manufactured by DKS Co. Ltd.) to manufacture [Powder material 11 for 3D modeling] and evaluated in the same manner as in Example 1. The results are shown in Tables 1 and 2.

Example 15

[3D object 15] was manufactured in the same manner as in Example 1 except that the water soluble resin was changed to starch (Histard PSS-5, manufactured by Sanwa Starch Co., Ltd.) and the cross-linking agent was changed to bisvinyl sulfone compound (VS-B (K-FJ-C), manufactured by FUJIFINE Chemical CORPORATION) to manufacture [Powder material 12 for 3D modeling] and evaluated in the same manner as in Example 1. The results are shown in Tables 1 and 2.

Example 16

[3D object 16] was manufactured in the same manner as in Example 15 except that the water soluble resin was changed to gelatin (beMatrix® gelatin, manufactured by Nitta Gelatin Inc.) to manufacture [Powder material 13 for 3D modeling] and evaluated in the same manner as in Example 1. The results are shown in Tables 1 and 2.

Example 17

[3D object 17] was manufactured in the same manner as in Example 1 except that the base material was changed to stainless steel SUS316L (PSS316L, volume average particle diameter: 20 μm or less, manufactured by SANYO SPECIAL STEEL Co., Ltd.) to manufacture [Powder material 14 for 3D modeling] and evaluated in the same manner as in Example 1. The results are shown in Tables 1 and 2.

Example 18

[3D object 18] was manufactured and evaluated in the same manner as in Example 1 except that the base material was changed to silica (EXCELICA SE-15K, volume average particle diameter: 24 μm, manufactured by Tokuyama Corporation) to manufacture [Powder material 15 for 3D modeling]. The results are shown in Tables 1 and 2.

Example 19

[3D object 19] was manufactured and evaluated in the same manner as in Example 1 except that the base material was changed to alumina (TAIMICRON TM-5D, volume average particle diameter: 0.3 μm, manufactured by TAIMEI CHEMICALS Co., Ltd.) to manufacture [Powder material 16 for 3D modeling]. The results are shown in Tables 1 and 2.

Example 20

[3D object 20] was manufactured and evaluated in the same manner as in Example 1 except that the base material was changed to zirconia (TZ-1353, volume average particle diameter: 50 μm, manufactured by TOSOH CORPORATION) to manufacture [Powder material 17 for 3D modeling] and evaluated in the same manner as in Example 1. The results are shown in Tables 1 and 2.

Example 21

[Powder material 18 for 3D modeling] was manufactured except that the base material was changed to stainless steel SUS316L (PSS316L, volume average particle diameter: 20 μm, manufactured by Sanyo Special Steel Co., Ltd.). Thereafter, the powder material was classified by a sonic wave screen shaker (SW-20A, manufactured by TSUTSUI SCIENTIFIC INSTRUMENTS CO., LTD.) to collect powder that had passed through the opening of 5 μm φ of the screen. The collected powder was defined as [Powder material 18 for 3D modeling].

Using the thus-obtained [Powder material 18 for 3D modeling], [3D object 21] was manufactured and evaluated in the same manner as in Example 1. The results are shown in Tables 1 and 2.

Example 22

[Powder material 19 for 3D modeling] was manufactured in the same manner as in Example 1 except that the base material was changed to stainless steel SUS316L (PSS316L, volume average particle diameter: 20 μm or less, manufactured by Sanyo Special Steel Co., Ltd.). Thereafter, the powder material was classified by a sonic wave screen shaker (SW-20A, manufactured by TSUTSUI SCIENTIFIC INSTRUMENTS CO., LTD.) to collect powder that had passed through the opening of 10 μm φ of the screen. The collected powder was defined as the powder 19 for 3D modeling.

Using the thus-obtained [Powder material 19 for 3D modeling], [3D object 22] was manufactured and evaluated in the same manner as in Example 1. The results are shown in Tables 1 and 2.

Example 23

[3D object 20] was manufactured in the same manner as in Example 1 except that the base material was changed to stainless steel SUS316L (PSS31L, volume average particle diameter: 10 μm or less, manufactured by SANYO SPECIAL STEEL Co., Ltd.) to manufacture [Powder material 20 for 3D modeling] and evaluated in the same manner as in Example 1.

Using the thus-obtained [Powder material 20 for 3D modeling], [3D object 23] was manufactured and evaluated in the same manner as in Example 1. The results are shown in Tables 1 and 2.

Example 24

[3D object 24] was manufactured and evaluated in the same manner as in Example 1 except that the surfactant was changed to FTERGENT 300 and [Surfactant added coating liquid 2] was used to manufacture [Powder material 21 for 3D modeling]. The results are shown in Tables 1 and 2.

Example 25

[3D object 25] was manufactured and evaluated in the same manner as in Example 1 except that the surfactant was changed to FTERGENT 320 and [Surfactant added coating liquid 2] was used to manufacture [Powder material 22 for 3D modeling]. The results are shown in Tables 1 and 2.

Example 26

[3D object 26] was manufactured and evaluated in the same manner as in Example 1 except that 0.006 parts of [Surfactant solution 1] was added to 120 parts of [Coating liquid 1] instead of 0.12 parts of [Surfactant solution 1] to manufacture [Powder material 23 for 3D modeling]. The results are shown in Tables 1 and 2.

Example 27

[3D object 27] was manufactured and evaluated in the same manner as in Example 1 except that 2.4 parts of [Surfactant solution 1] was added to 120 parts of [Coating liquid 1] instead of 0.12 parts of [Surfactant solution 1] to manufacture [Powder material 24 for 3D modeling]. The results are shown in Tables 1 and 2.

Example 28

[3D object 28] was manufactured and evaluated in the same manner as in Example 1 except that 4.8 parts of [Surfactant solution 1] was added to 120 parts of [Coating liquid 1] instead of 0.12 parts of [Surfactant solution 1] to manufacture [Powder material 25 for 3D modeling]. The results are shown in Tables 1 and 2.

Comparative Example 1

[3D object 29] was manufactured and evaluated in the same manner as in Example 1 except that [Coating liquid 1] to which no surfactant was added during coating was used to manufacture [Powder material 26 for 3D modeling]. The results are shown in Tables 1 and 2.

Comparative Example 2

[Powder material 27 for 3D modeling] was manufactured in the same manner as in Example 1 except that [Powder material 1 for 3D modeling] was subject to fluorine gas surface treatment to form a perfluoro-modified layer having a thickness of 5 μm on the surface. A 3D object was attempted to be manufactured in the same manner as in Example 1 except the above but in vain because the shape collapsed when taking out the 3D object.

Comparative Example 3

A 3D object was attempted to be manufactured in the same manner as in Example 1 except that [Powder material 28 for 3D modeling] which was coated with no coating liquid or surfactant added coating liquid was used but in vain because the shape collapsed when taking out the 3D object.

TABLE 1

| | Powder material for 3D modeling | | | | | |
|---|---|---|---|---|---|---|
| | | Base material | | Organic material | | |
| | No. of powder material | No. of base material | Kind | No. of organic material | Kind | Viscosity (mPa · s) |
| Example 1 | 1 | 1 | SUS316L | 1 | Polyvinyl alcohol | 5.0-6.0 |
| Example 2 | 2 | 1 | SUS316L | 1 | Polyvinyl alcohol | 5.0-6.0 |
| Example 3 | 3 | 1 | SUS316L | 1 | Polyvinyl alcohol | 5.0-6.0 |
| Example 4 | 2 | 1 | SUS316L | 1 | Polyvinyl alcohol | 5.0-6.0 |
| Example 5 | 2 | 1 | SUS316L | 1 | Polyvinyl alcohol | 5.0-6.0 |
| Example 6 | 4 | 1 | SUS316L | 2 | Polyvinyl alcohol | 29-35.0 |
| Example 7 | 5 | 1 | SUS31.6L | 3 | Polyacrylic acid | 1.0-3.0 |
| Example 8 | 6 | 1 | SUS316L | 4 | Polyacrylic acid Na | 3.0-5.0 |
| Example 9 | 6 | 1 | SUS316L | 4 | Polyacrylic acid Na | 3.0-5.0 |
| Example 10 | 7 | 1 | SUS316L | 5 | Acetoacetyl group-modified polyvinyl alcohol | 24.0-30.0 |
| Example 11 | 8 | 1 | SUS316L | 6 | Acetoacetyl group-modified polyvinyl alcohol | 27.0-30.0 |
| Example 12 | 9 | 1 | SUS316L | 7 | Butane diol vinyl alcohol polymer | 3.0 |
| Example 13 | 10 | 1 | SUS316L | 8 | Carboxylmethyl cellulose Na | 10.0-15.0 |
| Example 14 | 11 | 1 | SUS316L | 9 | Carboxylmethyl cellulose Na | 35.0-40.0 |
| Example 15 | 12 | 1 | SUS316L | 10 | Starch | 6.0 |
| Example 16 | 13 | 1 | SUS316L | 11 | Gelatin | 10.0 |
| Example 17 | 14 | 2 | SUS316L | 1 | Polyvinyl alcohol | 5.0-6.0 |
| Example 18 | 15 | 3 | SiO2 | 1 | Polyvinyl alcohol | 5.0-6.0 |
| Example 19 | 16 | 4 | Al2O3 | 1 | Polyvinyl alcohol | 5.0-6.0 |
| Example 20 | 17 | 5 | ZrO3 | 1 | Polyvinyl alcohol | 5.0-6.0 |

TABLE 1-continued

| | | | | | | |
|---|---|---|---|---|---|---|
| Example 21 | 18 | 6 | SUS316L | 1 | Polyvinyl alcohol | 5.0-6.0 |
| Example 22 | 19 | 7 | SUS316L | 1 | Polyvinyl alcohol | 5.0-6.0 |
| Example 23 | 20 | 8 | SUS316L | 1 | Polyvinyl alcohol | 5.0-6.0 |
| Example 24 | 21 | 1 | SUS316L | 1 | Polyvinyl alcohol | 5.0-6.0 |
| Example 25 | 22 | 1 | SUS316L | 1 | Polyvinyl alcohol | 5.0-6.0 |
| Example 26 | 23 | 1 | SUS316L | 1 | Polyvinyl alcohol | 5.0-6.0 |
| Example 27 | 24 | 1 | SUS316L | 1 | Polyvinyl alcohol | 5.0-6.0 |
| Example 28 | 25 | 1 | SUS316L | 1 | Polyvinyl alcohol | 5.0-6.0 |
| Comparative Example 1 | 26 | 1 | SUS316L | 1 | Polyvinyl alcohol | 5.0-6.0 |
| Comparative Example 2 | 27 | 1 | SUS316L | 1 | Polyvinyl alcohol (fluorine-modified) | 5.0-6.0 |
| Comparative Example 3 | 28 | 1 | SUS316L | 1 | — | — |

| | Powder material for 3D modeling | | | |
|---|---|---|---|---|
| | Surfactant | | Wetting | Surface coverage |
| | No. of surfactant | Kind | tension (mN/m) | (percent) factor |
| Example 1 | 1 | FTERGENT 310 | 25.4 | 100 |
| Example 2 | 1 | FTERGENT 310 | 25.4 | 15 |
| Example 3 | 1 | FTERGENT 310 | 25.4 | 100 |
| Example 4 | 1 | FTERGENT 310 | 25.4 | 15 |
| Example 5 | 1 | FTERGENT 310 | 25.4 | 15 |
| Example 6 | 1 | FTERGENT 310 | 25.4 | 15 |
| Example 7 | 1 | FTERGENT 310 | 25.4 | 100 |
| Example 8 | 1 | FTERGENT 310 | 25.4 | 100 |
| Example 9 | 1 | FTERGENT 310 | 25.4 | 100 |
| Example 10 | 1 | FTERGENT 310 | 25.4 | 100 |
| Example 11 | 1 | FTERGENT 310 | 25.4 | 100 |
| Example 12 | 1 | FTERGENT 310 | 25.4 | 100 |
| Example 13 | 1 | FTERGENT 310 | 25.4 | 100 |
| Example 14 | 1 | FTERGENT 310 | 25.4 | 100 |
| Example 15 | 1 | FTERGENT 310 | 25.4 | 100 |
| Example 16 | 1 | FTERGENT 310 | 25.4 | 100 |
| Example 17 | 1 | FTERGENT 310 | 25.4 | 100 |
| Example 18 | 1 | FTERGENT 310 | 25.4 | 100 |
| Example 19 | 1 | FTERGENT 310 | 25.4 | 100 |
| Example 20 | 1 | FTERGENT 310 | 25.4 | 100 |
| Example 21 | 1 | FTERGENT 310 | 25.4 | 100 |
| Example 22 | 1 | FTERGENT 310 | 25.4 | 100 |

TABLE 1-continued

| | | | | |
|---|---|---|---|---|
| Example 23 | 1 | FTERGENT 310 | 25.4 | 100 |
| Example 24 | 2 | FTERGENT 300 | 25.4 | 100 |
| Example 25 | 3 | FTERGENT 320 | 25.4 | 100 |
| Example 26 | 1 | FTERGENT 300 | 22.6 | 100 |
| Example 27 | 1 | FTERGENT 300 | 27.3 | 100 |
| Example 28 | 1 | FTERGENT 300 | 22.6 | 100 |
| Comparative Example 1 | — | None | 32 | 100 |
| Comparative Example 2 | — | None | 18.5 | 100 |
| Comparative Example 3 | — | None | Not measurable | 0 |

TABLE 2

| | Modeling liquid | | Powder material for 3D molding | | | | | |
|---|---|---|---|---|---|---|---|---|
| | No. of modeling liquid | Cross-linking agent | No. of powder material | Coverage thickness (nm) | Surface coverage factor (percent) | Average particle diameter (μm) | Fluidity repose angle (degree) | Evaluation on thin layer thickness deviation |
| Example 1 | 1 | zirconium oxychloride octahydrate | 1 | 100 | 100 | 43 | 32 | A |
| Example 2 | 1 | zirconium oxychloride octahydrate | 2 | 5 | 15 | 43 | 29 | B |
| Example 3 | 1 | zirconium oxychloride octahydrate | 3 | 500 | 100 | 88 | 38 | B |
| Example 4 | 2 | zirconium oxychloride octahydrate | 2 | 5 | 15 | 43 | 29 | B |
| Example 5 | 3 | zirconium oxychloride octahydrate | 2 | 5 | 15 | 43 | 29 | B |
| Example 6 | 1 | zirconium oxychloride octahydrate | 4 | 5 | 15 | 125 | 35 | B |
| Example 7 | 4 | Aluminum hydroxide | 5 | 100 | 100 | 43 | 30 | B |
| Example 8 | 4 | Aluminum hydroxide | 6 | 100 | 100 | 43 | 34 | B |
| Example 9 | 5 | Aluminum hydroxide | 6 | 100 | 100 | 43 | 34 | B |
| Example 10 | 6 | ammonium salt of zirconium carbonate | 7 | 100 | 100 | 48 | 36 | A |
| Example 11 | 6 | ammonium salt of zirconium carbonate | 8 | 100 | 100 | 47 | 37 | A |
| Example 12 | 6 | ammonium salt of zirconium carbonate | 9 | 100 | 100 | 48 | 28 | A |
| Example 13 | 7 | basic aluminum acetate | 10 | 100 | 100 | 85 | 27 | B |
| Example 14 | 7 | basic aluminum acetate | 11 | 100 | 100 | 220 | 38 | B |
| Example 15 | 8 | Bisvinyl sulfone compound | 12 | 100 | 100 | 43 | 30 | B |

TABLE 2-continued

| | | | | | | | | |
|---|---|---|---|---|---|---|---|---|
| Example 16 | 8 | Bisvinyl sulfone compound | 13 | 100 | 100 | 43 | 30 | B |
| Example 17 | 1 | zirconium oxychloride octahydrate | 14 | 100 | 100 | 15 | 42 | B |
| Example 18 | 1 | zirconium oxychloride octahydrate | 15 | 100 | 100 | 15 | 33 | B |
| Example 19 | 1 | zirconium oxychloride octahydrate | 16 | 100 | 100 | 250 | 39 | B |
| Example 20 | 1 | zircoinum oxychloride octahydrate | 17 | 100 | 100 | 48 | 30 | B |
| Example 21 | 1 | zirconium oxychloride octahydrate | 18 | 100 | 100 | 3 | 43 | A |
| Example 22 | 1 | zirconium oxychloride octahydrate | 19 | 100 | 100 | 5 | 42 | A |
| Example 23 | 1 | zirconium oxychloride octahydrate | 20 | 100 | 100 | 10 | 42 | A |
| Example 24 | 1 | zirconium oxychloride octahydrate | 21 | 100 | 100 | 43 | 33 | B |
| Example 25 | 1 | zirconium oxychloride octahydrate | 22 | 100 | 100 | 43 | 33 | B |
| Example 26 | 1 | zirconium oxychloride octahydrate | 23 | 100 | 100 | 43 | 29 | B |
| Example 27 | 1 | zirconium oxychloride octahydrate | 24 | 100 | 100 | 43 | 34 | B |
| Example 28 | 1 | zirconium oxychloride octahydrate | 25 | 100 | 100 | 43 | 29 | B |
| Comparative Example 1 | 1 | zirconium oxychloride octahydrate | 26 | 100 | 100 | 43 | 35 | C |
| Comparative Example 2 | 1 | zirconium oxychloride octahydrate | 27 | 100 | 100 | 43 | 27 | B |
| Comparative Example 3 | 1 | zirconium oxychloride octahydrate | 28 | 100 | 0 | 0 | 35 | C |

| | 3D object | |
|---|---|---|
| | No. of 3D object | Able to form object? |
| Example 1 | 1 | Yes |
| Example 2 | 2 | Yes |
| Example 3 | 3 | Yes |
| Example 4 | 4 | Yes |
| Example 5 | 5 | Yes |
| Example 6 | 6 | Yes |
| Example 7 | 7 | Yes |
| Example 8 | 8 | Yes |
| Example 9 | 9 | Yes |
| Example 10 | 10 | Yes |
| Example 11 | 11 | Yes |
| Example 12 | 12 | Yes |
| Example 13 | 13 | Yes |
| Example 14 | 14 | Yes |
| Example 15 | 15 | Yes |
| Example 16 | 16 | Yes |
| Example 17 | 17 | Yes |
| Example 18 | 18 | Yes |
| Example 19 | 19 | Yes |
| Example 20 | 20 | Yes |
| Example 21 | 21 | Yes |
| Example 22 | 22 | Yes |
| Example 23 | 23 | Yes |
| Example 24 | 24 | Yes |
| Example 25 | 25 | Yes |

TABLE 2-continued

| | | |
|---|---|---|
| Example 26 | 26 | Yes |
| Example 27 | 27 | Yes |
| Example 28 | 28 | Yes |
| Comparative Example 1 | 29 | Yes |
| Comparative Example 2 | 30 | No |
| Comparative Example 3 | 31 | No |

According to the present disclosure, a powder material for 3D modeling is provided which has excellent fluidity during modeling, forms a thin layer having a uniform thickness during forming of the layer, avoids creating a portion having less strength inviting collapse, and enables an object to hold its form.

Having now fully described embodiments of the present invention, it will be apparent to one of ordinary skill in the art that many changes and modifications can be made thereto without departing from the spirit and scope of embodiments of the invention as set forth herein.

What is claimed is:

1. A powder material for three-dimensional modeling comprising:
    a base particle; and
    a coverage film including an organic material, the coverage film covering the base particle,
    wherein the powder material is used for three dimensional modeling and when the coverage film is dissolved in a solvent to prepare a solution and the solution is formed into a coated film on a smooth surface, the coated film has a wetting tension of from 22 mN/m to 28 mN/m.

2. The powder material according to claim 1, wherein the coverage film includes at least one surfactant, which includes a fluorine-containing compound.

3. The powder material according to claim 2, wherein the fluorine-containing compound accounts for 0.001 percent by mass to 5 percent by mass of the coverage film.

4. The powder material according to claim 1, wherein the organic material includes a polyvinyl alcohol resin.

5. The powder material according to claim 1, wherein the organic material includes a polyvinyl alcohol resin modified by an acetoacetyl group.

6. The powder material according to claim 1, wherein the base particle includes at least one of a metal particle and a ceramic particle.

7. A kit for three dimensional modeling comprising:
    the powder material of claim 1; and
    a modeling liquid including an aqueous medium and a cross-linking agent to cross-link with the organic material.

8. A device for manufacturing a three-dimensional object comprising:
    a powder material layer forming device to form a layer of the powder material of claim 1; and
    a modeling liquid applying device to apply a modeling liquid to an area in the layer, the modeling liquid including an aqueous medium and a cross-linking agent to cross-link with the organic material, to cross-link and cure the area;
    a powder material containing unit containing the powder material; and
    a modeling liquid containing unit containing the modeling liquid.

9. A method of forming a three-dimensional object comprising:
    forming a layer of the powder material of claim 1;
    applying a modeling liquid to an area in the layer, the modeling liquid including an aqueous medium and a cross-linking agent to cross-link with the organic material, to cure and cross-link the area; and
    repeating the forming and the applying to manufacture the three-dimensional object.

* * * * *